April 26, 1927.

H. A. STRUPP

CONNECTING ROD ATTACHMENT

Filed Nov. 3, 1925

1,625,965

Inventor
Herbert A. Strupp
By Mason Fenwick & Lawrence
Attorneys

Patented Apr. 26, 1927.

1,625,965

UNITED STATES PATENT OFFICE.

HERBERT AUGUST STRUPP, OF EVANSVILLE, INDIANA.

CONNECTING-ROD ATTACHMENT.

Application filed November 3, 1925. Serial No. 66,528.

This invention relates to improvements in connecting rods commonly used with reciprocating motors, engines and the like.

An object of this invention is to provide a connecting rod ordinarily subjected to the effect of a piston slap, with a suitably formed weight outside of the crank journal, thereby preventing bearings from wearing in irregular shape, thereby eliminating knocking noises.

A further object of this invention is to provide a connecting rod whose piston pin journal and crank pin journal will cause an even wearing of bearing surfaces thereby preventing the journals or bearings from wearing egg shape or otherwise, and also acting to reduce to the minimum the above mentioned knocking noises common to connecting rods subjected to a counterwise piston slap or sometimes called reverse slap.

Other objects of this invention will appear from the following detailed description and as disclosed in the single sheet of drawings herewith made a part of this application.

Figure 1:
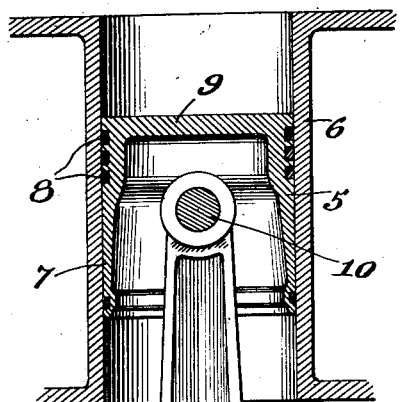
Fig. 1 illustrates a vertical elevational view of a connecting rod piston and balance weight in assembled form.
Figure 2:
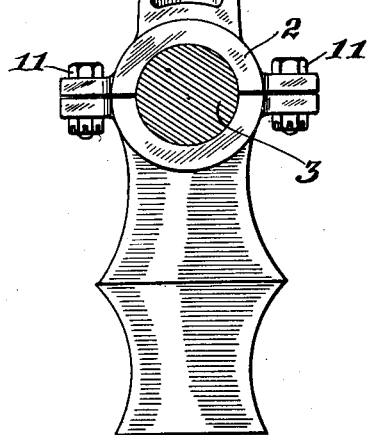
Fig. 2 represents a perspective view of the balance or compensating weight detached from the main body portion of the connecting rod.
Figure 2:
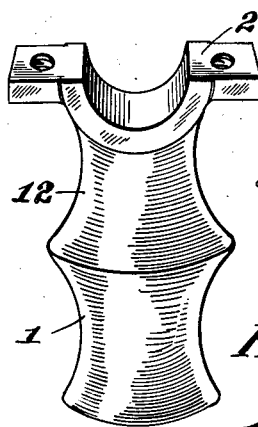

Numeral 1 designates a balance or compensating weight preferably of circular grooved formation or otherwise, adapted to be attached to the outermost portion of the crank journal 2, which carries in the usual manner a crank pin 3, acting in conjunction with the connecting rod 4, piston 5 and cylinder 6.

In the piston 5, numeral 7 designates the skirt portion thereof, while numerals 8 and 9 represent the piston rings and the piston head portion, respectively, while 10 designates the piston pin.

The weighted portion of the connecting rod may be fastened to the main body portion of the rod at the crank pin journal by means of any suitable device such as machine bolts 11 or otherwise.

In operation, this invention consists in part of a suitable added weight to the connecting rod, thereby assuring smooth running bearings without sacrificing the strength or efficiency of the piston.

It is old and common to adjust the connecting rod in relation to the piston pin center and the crank pin center so that the center of gravity or neutral point will fall at the crank pin center after taking into consideration the breaking strains set up in the rod proper.

In this invention the neutral center is not intended to be located at the center of the crank pin when the heavy part of head 9 is omitted from consideration, the piston will balance about the pin 10, and the weight 1 is designed so that when it is added to weight 12, the two together will counterbalance the piston rod, wrist pin, and that portion only of the piston having its center of gravity in the axis of the wrist pin.

This additional weight suitably proportioned will cause the piston pin journal and crank pin journal to describe a lapping on all surfaces of the bearing, and thereby reducing to a minimum, the knocking noises common to motors and engines. In other words, this invention will allow for an error due to the weight of the piston head and bring the weight of the piston into centrifugal rotation, so that when deduction is made of the piston head weight, the skirt portion of the piston, piston pin, piston rings and upper rod portion will balance properly at the crank pin center.

It is a common practice, in order to obtain the proper maximum strength and efficiency to over-balance the head end of a piston against the skirt portion and this invention does not take into consideration this piston head over-balance, therefore, the combination as herein described and specified, does not have its neutral point at the axis of crank pin.

What I claim is:

In an engine, a cylinder; a piston reciprocable therein, a wrist pin secured in said piston with the center of gravity of the piston lying between the head of the piston and the axis of said pin, a crank shaft, a piston rod connecting said wrist pin and shaft, and a weight secured to said rod on the side of said shaft remote from the wrist pin to counterbalance said rod, wrist pin, and that portion only of said piston which has its center of gravity coincident with the axis of said wrist pin.

In testimony whereof I affix my signature.

HERBERT AUGUST STRUPP.